United States Patent [19]

Blatt

[11] Patent Number: 4,470,487
[45] Date of Patent: Sep. 11, 1984

[54] FAIL SAFE BRAKE FOR DRIVE SHAFTS

[76] Inventor: Leland F. Blatt, 31915 Groesbeck Hwy., Fraser, Mich. 48026

[21] Appl. No.: 404,589

[22] Filed: Aug. 2, 1982

[51] Int. Cl.³ .................... F16D 65/24; F16D 65/26
[52] U.S. Cl. .................... 188/170; 188/367; 188/72.3; 188/72.4
[58] Field of Search .......... 188/71.1, 71.7, 72.1, 188/72.3, 72.4, 366, 170, 367; 192/91 A, 85 AA, 85 A; 308/189 R

[56] References Cited

U.S. PATENT DOCUMENTS

| | | | |
|---|---|---|---|
| 2,345,952 | 4/1944 | Smith | 308/189 R |
| 2,359,516 | 10/1944 | Frank | 188/367 |
| 2,799,374 | 7/1957 | Salome et al. | 192/91 A |
| 3,559,772 | 2/1971 | Gromka | 188/170 |
| 4,057,297 | 11/1977 | Beck et al. | 188/170 |

*Primary Examiner*—Bruce H. Stoner, Jr.
*Assistant Examiner*—Alvin Oberley

*Attorney, Agent, or Firm*—Cullen, Sloman, Cantor, Grauer, Scott & Rutherford

[57] ABSTRACT

A fail safe brake for a power operated drive shaft comprises a cylinder mounting spaced bearings. A flywheel sleeve is journaled through the bearings and is keyed to the drive shaft and includes a radial flywheel. A brake pad mount is axially supported within the cylinder and mounts a brake pad normally spaced from the flywheel and adapted for movement into operative frictional engagement with the flywheel under the action of a plurality of compressed springs. A brake pad actuator responsive to pressure fluid is mounted within the cylinder and engages the brake pad mount. Pressure fluid when applied to the cylinder acts on the brake pad actuator to retract the brake pad mount against the springs. The brake pad is adapted to operatively move against the flywheel on interruption of the pressure fluid.

8 Claims, 4 Drawing Figures

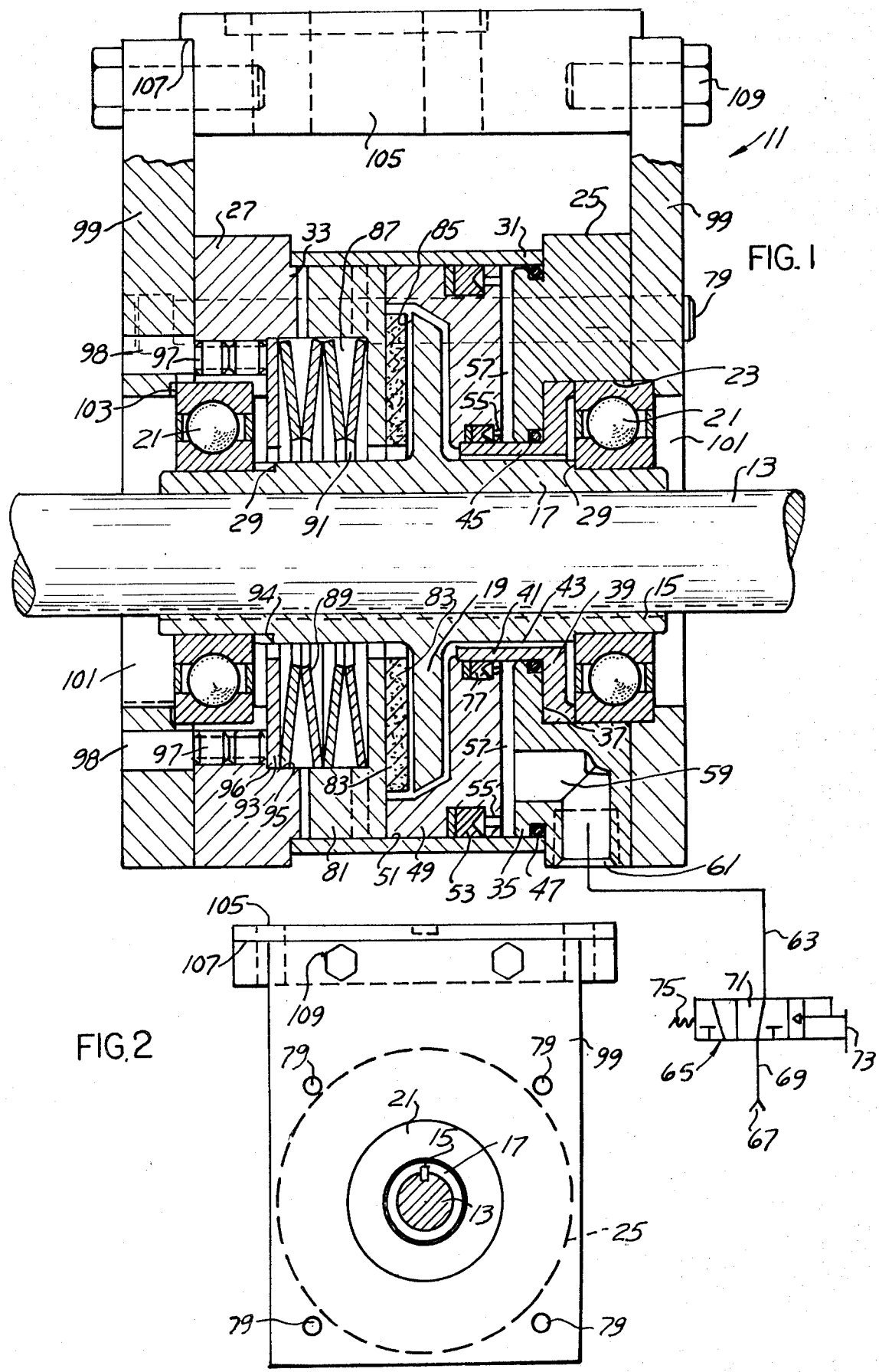

FAIL SAFE BRAKE FOR DRIVE SHAFTS

BACKGROUND OF THE INVENTION

In many constructions utilizing power operated drive shafts, it is often desirable to apply a braking action to the drive shaft. This is often under certain conditions such as in the case of a power failure or an emergency stop situation. Heretofore electronic brakes and other types of power brakes have been employed engageable with the power driven shaft for stopping the shaft as desired.

A fail safe brake mechanism is particularly adaptable for use in conjunction with motor operated lift units such as set forth in copending U. S. Pat. application Ser. No. 287,765 filed on July 29, 1981, now U.S. Pat. No. 4,444,540. Such a brake construction would also be adaptable to the power driven shafts employed in electrically driven shuttle units such as disclosed in copending patent application Ser. No. 284,559 filed July 20, 1981.

SUMMARY OF THE INVENTION

An important feature of the present invention is to provide a fail safe brake for power operated drive shafts wherein a flywheel is keyed to the shaft within a cylinder which supports a brake pad mount and brake pad normally spaced from the flywheel and adapted under spring action to move axially into operative frictional retaining engagement with a flywheel, and wherein fluid pressure means is employed until interrupted for maintaining the brake pad mount in a retracted position with the brake pad spaced from the flywheel for normal operation.

It is a further feature to provide a means by which upon interruption of the source of pressure fluid, the springs are effective to automatically move the brake pad mount and brake pad into operative braking engagement with the flywheel.

A further feature is to provide within a cylinder having endcaps a pair of spaced bearings journaling a flywheel sleeve which includes an axial flywheel and wherein a brake pad mount supports a brake pad normally retracted from but adapted for operative retaining engagement with the flywheel under action of a plurality of compressed springs and wherein there is employed a fluid pressure means directed to a pressure chamber within which is movably positioned a brake pad actuator for axially retracting the brake pad mount against the action of said springs for normal operation and wherein upon interruption of the pressure medium the brake pad is automatically applied to the flywheel.

A further feature provides in conjunction with the brake pad actuator a sealing sleeve within the cylinder which slidably and sealing receives the brake pad actuator therein.

A further feature of the present invention includes in conjunction with the pressure chamber within the cylinder adjacent the brake pad actuator, of a pressure fluid means pneumatic or hydraulic and which includes a port and passage within an endcap of the cylinder adjacent the pressure chamber connected by a suitable conduit to a reversable three way valve connected to a source of pressurized fluid. Upon application of pressure fluid from said source to the pressure chamber, the brake pad actuator is advanced for retracting the brake pad mount against the spring mechanism providing a running clearance between the brake pad and the adjacent flywheel during normal operation.

A further feature contemplates that upon interruption of the pressure source such as due to a power failure or for an emergency stop situation, the pressure fluid directed to the pressure chamber is released so that the springs are effective to automatically effect the braking action of the brake pad with respect to the flywheel.

A further feature contemplates that the activation of the brake pad actuator may be by a flexible annular diaphragm arranged upon one side of the brake pad actuator with internal and exterior peripheral portions anchored with respect to the adjacent end cap and thereby responsive to pressure fluid delivered to the pressure chamber for advancing the brake pad actuator and correspondingly retracting the brake pad mount against the springs within the brake assembly.

These and other features and objects will be seen from the following specification and claims in conjunction with the appended drawings.

THE DRAWINGS

FIG. 1 is a fragmentary vertical section of the present fail safe brake for power operated drive shaft with the drive shaft fragmentarily shown and with the schematic showing of a pressure source connected to the pressure chamber within the cylinder.

FIG. 2 is a right side elevational view thereof upon a reduced scale.

Figure 3:
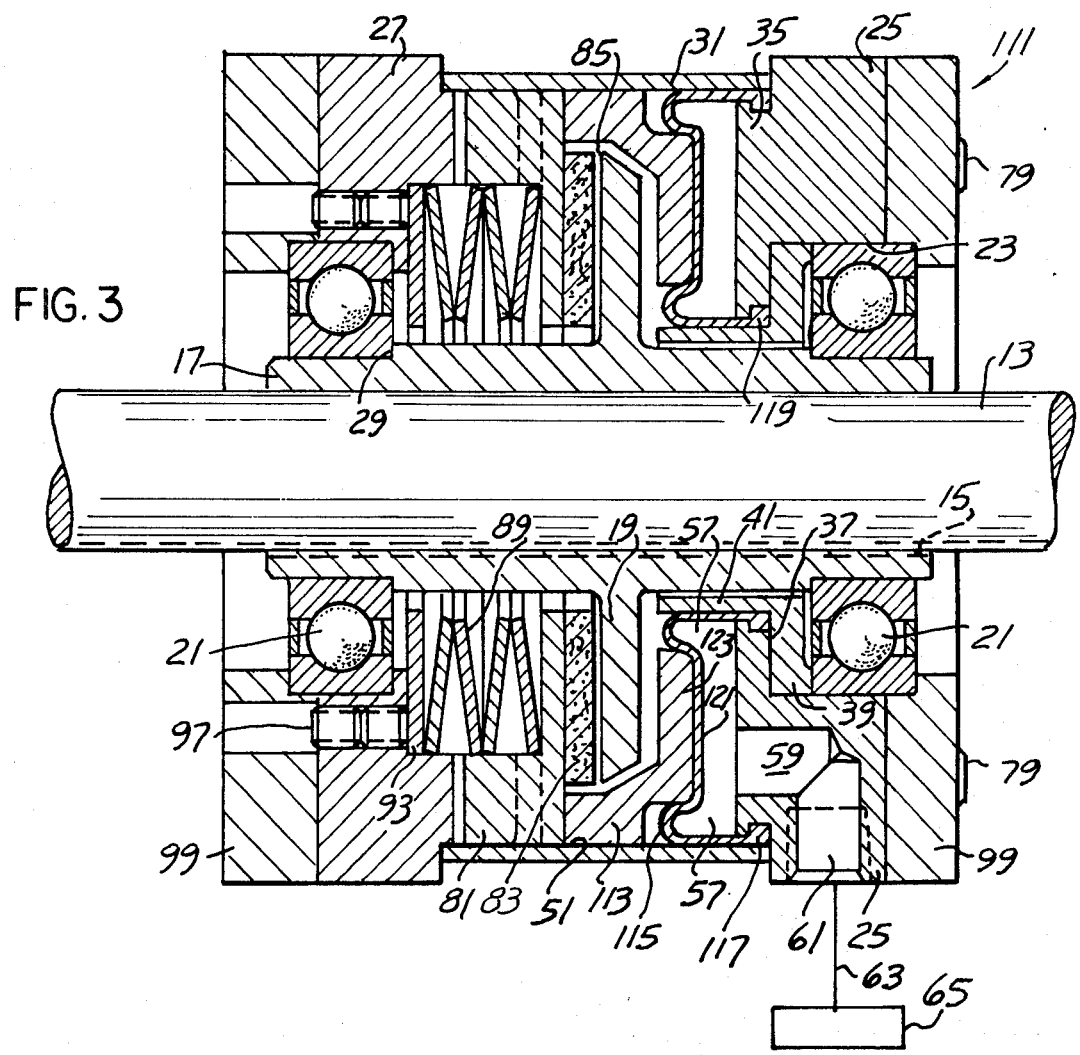
FIG. 3 is a vertical section corresponding to FIG. 1 showing a modified fail safe brake for a power operated drive shaft.

It would be understood that the above drawings illustrate merely referred embodiments of the invention and that other embodiments are contemplated within the scope of the claims hereafter set forth.

DETAILED DESCRIPTION OF AN EMBODIMENT OF THE INVENTION

Referring to the drawings, FIGS. 1 and 2, the present fail safe brake for power operated drive shafts is generally indicated at 11, the motor operated drive shaft being designated as 13. The present brake is adaptable for many types of power operated drive shafts and is particularly useful in connection with the motor operated drive shaft within the lift unit disclosed in copending U.S. application Ser. No. 287,765 filed July 29, 1981.

The present brake would be particularly adaptable further to the power driven shaft shown in the shuttle unit disclosed in copending application 284,559 filed July 0, 1981.

In the illustrative embodiment, the drive shaft 13 is axially projected through flywheel sleeve 17 and keyed or splined thereto as at 15. Elongated flywheel sleeve 17 intermediate its ends has thereon the radial flywheel 19 and is mounted upon the opposed spaced ball bearings 21 within bores 23 in the end caps 25 and 27.

A portion of the flywheel sleeve 17 intermediate its ends is of increased diameter defining a pair of spaced annular shoulders 29 registerable with the bearings 21 for limiting longitudinal movement of the bearing sleeve 17 relative to end caps 25 and 27 forming a part of the brake assembly.

Cylinder tube 31 is interposed between end caps 25 and 27. Endcap 27 has an annular boss 33 of reduced diameter which is snugly projected into one end of cylinder 31. End cap 25 has an undercut annular boss 35 of reduced diameter which is snugly projected into the opposite end of cylinder 31 and sealed therein by the O-ring 47.

End cap 25 has an interior annular recess 37 within which is positioned and retained the annular boss or flange 39 of the sealing sleeve 41. Said sleeve projects from boss 39 and loosely surrounds a portion of the flywheel sleeve 17 defining therebetween clearance 43. The sealing sleeve 41 is sealed with respect to boss 35 of end cap 25 by a corresponding O-ring 45 nested within an annular internal recess within said endcap, FIG. 1.

The annular floating piston 49, sometimes referred to as brake pad actuator is reciprocally, slidably and axially movable within the bore 51 of cylinder 31.

Annular dynamic seal 53 is nested within a corresponding annular recess within floating piston 49 and is in sealing registry with cylinder 31. Dynamic seal 53 through an annular passage 55 within said piston is in communication with the pressure chamber 57 within said cylinder outwardly of piston 49.

Passage 59 within endcap 25 at one end communicates with pressure chamber 57 and at its other end terminates in the port 61 to which is connected a conduit 63 for pressurized fluid such as compressed air or hydraulic fluid. Conduit 63 extends to the outlet of the three way pneumatic or hydraulic valve 65 which is connected by conduit 69 to a source of pressurized air 67 or other pressurized fluid.

Within the three way valve 65 is a conventional valve element 71, air pilot operated at 73 at one end, but which could be actuated by an equivalent construction namely, a solenoid. The opposite end of the valve element 71 is provided with a biasing spring 75 normally urging the valve element 71 to a cut-off position as shown schematically.

Within an internal annular recess within brake pad actuator 49, there is procided a dynamic seal 77, similar in construction to the dynamic seal 53, adapted for cooperative sealing registry with an interior surface of sealing sleeve 41. Here also the seal 77 is in communication with the pressure chamber 57 through the annular passage 55, FIG. 1.

A plurality of parallel spaced tie rods 79 extend between the end caps 25 and 27 through the corresponding end plates 99 and are secured thereto in compression for effectively retaining together the assembly of the endcaps 25 and 27 within and with respect to cylinder 31.

Cylindrical brake pad mount 81 having an annular bore 87 upon one side is positioned around flywheel sleeve 17 and the shaft 13 and is adjustably nested for axial movements within bore 51 of said cylinder. Applied to one surface of the brake pad mount 81 is the disc like brake pad 83 made of a suitable fibrous material, as required, and is normally spaced from the flywheel 19 with a suitable running clearance designated at 85.

A plurality of slanted or angularly related disc springs 89 are nested in axial alignment within bore 87 of the brake pad mount with the innermost of said disc springs bearing against said brake pad mount. Adjusting disc 93 is movable nested within bore 95 within endcap 27 into which projects at least one of the disc springs 89.

Disc 93 bears against the internal shoulder 96 within endcap 27, and may be axially adjusted by a plurality of set screws 97 which are threaded axially through endcap 27 and at their inner ends are in operative engagement with said disc. Access to the respective set screws is through the corresponding clearance apertures 98 formed within end plate 99.

The respective end plates 99, centrally apertured at 101, each include internal shoulders 103 adapted to receive outer portions of the corresponding bearings 21 and for retaining said bearings in position within said endcaps when the end plates 99 have been tightly drawn up in compression with respect to endcaps 25 and 27 by the plurality of tie rods 79.

In the illustrative embodiment, spanning the respective end plates 99 at one end thereof, for illustration, is an elongated mount bracket 105. Said bracket has a transverse reduced portion, defining the shoulders 107, which projects down into and between the respective end plates 99 and is secured thereto by the cap screws 109.

OPERATION

In operation, with the three way valve 65 shown in FIG. 1, its valve element 71 is so positioned as by the air pilot 73 that pressurized fluid 67 is directed through conduits 69, 63 and through port 61 and passage 59 into the pressure chamber 57.

The pressure within said chamber is axially applied to the piston 49, also referred to as a brake pad actuator. Outer annular leading portions of said piston are spaced outwardly of flywheel 19 and the adjacent brake pad 83 and operatively engage annular portions of the brake pad mount 81, FIG. 1. Accordingly on an axial inward movement of the piston 49, there is a corresponding retracting movement of the brake pad mount 81 against the action of the spring means or disc springs 89 which are apertured at 91 to receive the flywheel sleeve 19. As long as a predetemined pressure is maintained within chamber 57, the brake pad mount 81 is sufficiently retracted to establish the running clearance space 85 between the brake pad and radial flywheel 19. If said pressure is reduced or disconnected, brake action upon shaft 13 is automatic.

In the case of a power failure, or an emergency stop situation, or in any situation where it is desired to apply a braking action to the driven shaft 13, the connections within the three way valve 65 are reversed such as by deactivating the airpilot 73, or equivalent solenoid with the result that the valve element under its spring bias at 75 moves to the secondary position so that the pressurized fluid whether it be compressed air or liquid within chamber 57 is free to bleed through conduit 63.

The spring pressure from the disc springs 89, sometimes referred to as spring means is effective to axially retract the brake pad mount and connected brake lining 83 into operative frictional retaining engagement with the flywheel 19 creating a braking action retaining the shaft 13 which is keyed to the flywheel sleeve 17.

MODIFICATION

A modified fail safe brake for a power operated drive shaft is generally indicated at 111 in FIG. 3. The structure is essentially the same as that above described with respect to FIG. 1, except that that floating piston 49 is replaced by a brake pad actuator 113 which is guidably positioned within the bore 51 of cylinder 31.

A transverse rolling diaphragm 115 is nested within said cylinder, and made of a suitable flexible material such as neoprene, for example. Said diaphragm has an outer annular portion which cooperatively bears against bore 51 of cylinder 31. The diaphragm also has an inner annular portion which extends along and bears against the sealing sleeve 41. The corresponding inner and outer annular portions terminate in outer and inner anchor beads 117 and 119 which are nested and retained within corresponding undercut annular apertures formed within the corresponding end cap 25.

The diaphragm includes a central radial portion 121, FIG. 3 which operatively bears against the corresponding annular and radial portion 123 of the brake pad actuator 113.

Figure 4:
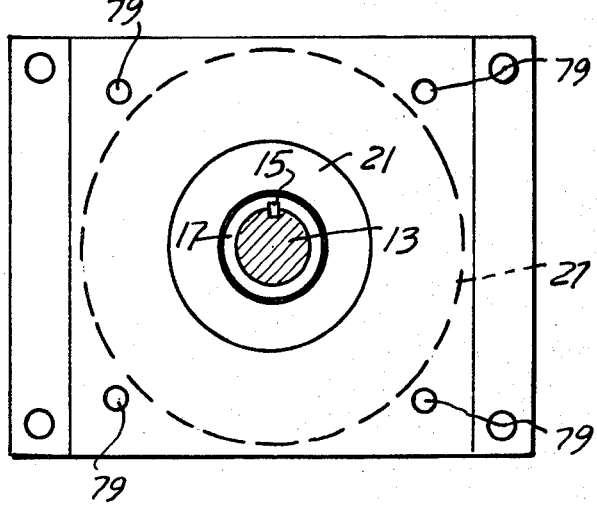
FIG. 4 is a right side elevational view thereof upon a reduced scale.

Accordingly the pressurized fluid, being of compressed air or hydraulic fluid, is delivered from the three way valve 65, the same as described with respect to FIG. 1, into the pressure chamber 57. The diaphragm 115 will be expanded in a rolling action so as to axially advance the brake pad actuator 113. This axial movement causes a corresponding retracting movement of the brake pad mount 81 and the brake pad 83 connected thereto compressing springs 89 to define the normal clearance spacing 85 between the brake pad 83 and the flywheel 19. When using the diaphragm 115, FIG. 3, the dynamic seals 53 and 77 described with respect to FIG. 1 are eliminated. The operation of the fail safe brake assembly 111 shown in FIGS. 3 and 4 are exactly the same as that above described with respect to FIGS. 1 and 2.

Having described my invention, reference should now be had to the following claims:

I claim:

1. A fail safe brake for a power operated drive shaft comprising a cylinder having a pair of apertured end caps;
    aligned spaced bearings retained within said end caps;
    a flywheel sleeve extending through said cylinder and end caps projected into and supporting said bearings, axially receiving and keyed to the drive shaft;
    a radial flywheel within said cylinder mounted upon said sleeve;
    an apertured brake pad mount axially adjustable within said cylinder and supporting a radial brake pad normally spaced axially from said flywheel and adapted for axial movement into operative frictional surface retaining engagement therewith;
    spring means in said cylinder bearing against one side of and normally biasing said brake pad mount axially toward said flywheel;
    a floating brake pad actuator slidably mounted within said cylinder radially outward of and spaced from said flywheel and engageable with the opposite side of said brake pad mount;
    a pressure fluid means connected to said cylinder for applying pressure to said brake pad actuator for axially retracting said brake pad mount and brake pad from said flywheel against said spring means, said spring means and brake pad mount adapted to automatically return said brake pad operatively against said flywheel upon disconnection of said pressure fluid means;
    and a sealing sleeve nested within and supported upon one end cap and extending axially of and loosely surrounding said flywheel sleeve;
    said brake pad acutator being guidably positioned and sealed upon said sealing sleeve for limited axial movements relative thereto.

2. In the brake of claim 1, spaced apertured end plates receiving said drive shaft retainingly bearing against said end caps and bearings;
    and a plurality of parallel spaced tie rods extending through said endcaps and retainingly engaging said end plates in compression relative to said cylinder.

3. In the brake of claim 1, said sealing sleeve having an external annular radial flange nested and retained within said one endcap against the adjacent bearing.

4. In the brake of claim 1, inner and outer dynamic concentric seals retained within said brake pad actuator respectively engaging said sealing sleeve and cyliner.

5. In the brake of claim 1, and an annular stop upon said brake pad actuator engageable with said sealing sleeve limiting retracting movements of said brake pad actuator.

6. In the brake of claim 1, said brake pad mount being cylindrical with one radial face supporting said brake pad;
    and its other face having an axial aperture;
    said spring means including a series of angularly related disc springs receiving said flywheel sleeve and nested within said latter axial aperture and retained by one of said endcaps.

7. In the brake of claim 1, said pressure fluid means including an annular flexible diaphragm within and at its outer periphery bearing against said cylinder and anchored to the adjacent endcap;
    and upon its internal periphery surrounding and bearing against said sealing sleeve and anchored to the adjacent endcap;
    an annular radial portion of said diaphragm operatively bearing against said brake pad actuator.

8. A fail safe brake for a power operated drive shaft comprising a cylinder having a pair of apertured end caps;
    aligned spaced bearings retained within said end caps;
    a flywheel sleeve extending through said cylinder and end caps projected into and supporting said bearings, axially receiving and keyed to the drive shaft;
    a radial flywheel within a cylinder mounted upon said sleeve;
    an apertured brake pad mount axially adjustable within said cylinder and supporting a radial brake pad normally spaced axially from said flywheel and adapted for axial movement into operative frictional surface retaining engagement therewith;
    spring means in said cylinder bearing against one side of and mormally biasing said brake pad mount axially toward said flywheel;
    a floating brake pad actuator slidably mounted within said cylinder radially outward of and spaced from said flywheel and engageable with the opposite side of said brake pad mount;
    a pressure fluid means connected to said cylinder for applying pressure to said brake pad actuator for axially retracting said brake pad mount and brake pad from said flywheel against said spring means, said spring means and brake pad mount adapted to automatically return said brake pad operatively against said flywheel upon disconnection of said pressure fluid means;
    said brake pad mount being cylindrical with one radial face supporting said brake pad;
    and its other face having an axial aperture;
    said spring means including a series of angularly related disc springs receiving said flywheel sleeve and nested within said latter axial aperture and retained by one of said endcaps;
    said latter endcap having an internal axial recess receiving some of said disc springs;
    an adjusting disc within said endcap recess bearing against the outermost of said springs;
    and a plurality of adjustable set screws threaded through said endcap in operative engagement with said adjusting disc for regulating the compression of said springs.

* * * * *